Oct. 6, 1942.  F. M. CARROLL  2,297,744
VERNIER MECHANISM
Filed May 3, 1941

INVENTOR
Fred M. Carroll
BY
W. M. Wilson
ATTORNEY

Patented Oct. 6, 1942

2,297,744

UNITED STATES PATENT OFFICE 2,297,744

VERNIER MECHANISM

Fred M. Carroll, Binghamton, N. Y., assignor to International Business Machines Corporation, New York, N. Y., a corporation of New York Application May 3, 1941, Serial No. 391,731

2 Claims. (Cl. 74—302)

This invention relates to vernier mechanisms wherein two axially aligned shafts are rotated at different rates of speed when a third independently rotatable member, making contact with each of the shafts through a ball clutch and a cooperative disk mounted on each shaft, is actuated.

In particular this invention relates to vernier mechanisms used in conjunction with the platens of various printing devices where line spacing is accomplished by rotation of the platen, and where line spacing adjustments less than the normal line space movement are required.

Vernier mechanisms are well known in the art, and many different types of friction contact and tooth contact combinations have been used. One of the most effective of the latter class is that employing a satellite gear or gears meshed with a common gear and a ring gear having unequal numbers of teeth. This type of vernier movement is positive, accurate, but expensive. Geared type verniers, by their nature, must be precision made throughout, and unless the gears are accurately cut, back-lash may occur.

An object, accordingly, of this invention is to provide a simple, low cost vernier mechanism, coactive between two axially aligned shafts, which is free from back-lash, and which is positive and accurate without the use of gears.

A further object of this invention is to provide a vernier mechanism which can be mounted at the common ends of two axially related shafts one within the other so as to regulate motion between them.

A still further object of this invention is to provide a vernier mechanism coactive between two axially aligned shafts in which the amount of vernier movement can be regulated by a simple beveling operation performed upon one or more of the active members connected to such shafts.

Another object is to provide a small, compact vernier mechanism of the friction type in which vernier movement is obtained by differential action between unequally beveled halves of an outer ball race forming member and the balls contacting it, and the transmission of such action through the balls to equally beveled halves of an inner ball race forming member.

Another object of this invention is to provide a small, compact vernier mechanism of the friction type in which vernier movement is obtained by uniform action between the equally beveled halves of an outer ball race forming member, and the balls contacting it, and the transmission of such action through the balls to unequally beveled halves of an inner ball race forming member through differential cooperation.

Still another object is to provide a small, compact vernier mechanism of the friction type in which vernier movement is obtained by a combination of differential action between unequally beveled halves of an outer ball race forming member and the balls, and the balls transmission of such action to unequally beveled halves of an inner ball race forming member through further differential action.

Other objects of the invention will be pointed out in the following description and claims and illustrated in the accompanying drawing, which disclose, by way of example, the principle of the invention and the best mode, which has been contemplated, of applying that principle.

Figure 1:
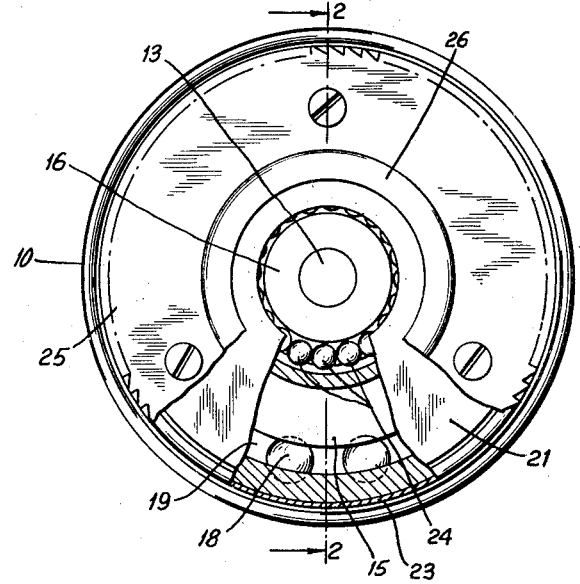
Fig. 1 is a front elevation view of the vernier mechanism showing cut away portions of the various component parts.
Figure 2:
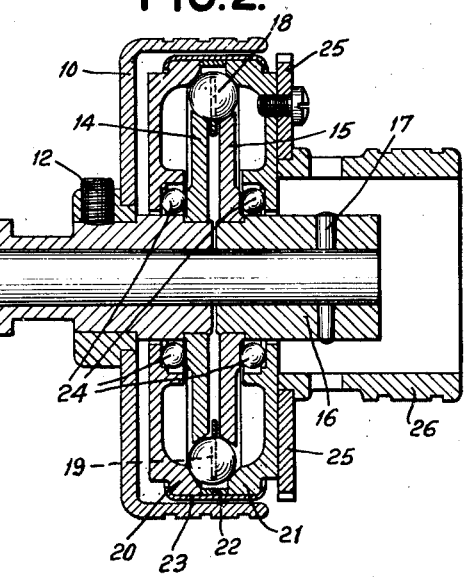
Fig. 2 is a sectional view along the line 2—2 of Fig. 1, and shows the assembled relationship between the component parts for a better understanding of the working principle of the mechanism.

Reference to Figs. 1 and 2, the major adjustment knob 10 is fastened to a driven sleeved shaft 11 (Fig. 2 only) by the set screw 12. A drive shaft 13 is contained within the sleeved shaft 11. Vernier movement is obtained between these two shafts 11 and 13. The left half 14 of an inner ball race member (see Fig. 2) is pressed onto the shaft 11 and the right half 15 of the inner ball race member is pressed onto a hub 16 which is pinned to shaft 13 by pin 17. Contacting and partially supported by the members 14 and 15 are a number of balls 18 evenly distributed about the inner race members by the ball cage 19.

The left half 20 of an outer ball race member rests against the balls 18 on one side of the cage 19, and the right half 21 of the outer ball race member rests against the other side. These two halves 20 and 21 are separated by the ring 22 and clamped together by the race shell 23 so that the balls 18 contact members 14, 15, 20 and 21 with some pressure. The members 14 and 15 on the inside and 20 and 21 on the outside of the balls 18 form the limits of a ball race. The ball bearings 24 form bearing contacts between the inner and outer race members as well as acting as spacers. A circular plate 25 having ratchet teeth cut into its periphery is fastened to the member 21 of the outer race member to rotate the entire outer race member (20 and 21) when pawl driven or when manually rotated by the vernier knob 26 connected to it.

At the points of contact with the balls 18, all of the members 14, 15, 20 and 21 are beveled. If the contacting portions of both members 20 and 21 are equally beveled, the balls 18 would be contacted at points on a line $t—t$ parallel to the axis of rotation of the members 20 and 21, $C—C$ (see Fig. 4). Similarly, if the contacting portions of both members 14 and 15 are equally beveled, the balls 18 would be contacted at points in a line $S—S$ parallel to the axis of rotation of the members 14 and 15, $C—C$ (see Fig. 3). If both of these conditions are satisfied and the outer race members 20 and 21 are rotated while one of the inner race members 14 or 15, is held fixed, no rotation of the free member of the inner race members 14 or 15, would occur, since the balls 18, impelled by frictional contact and rotation from the outer race members, would roll uniformly on both of the inner race members.

Figure 3:
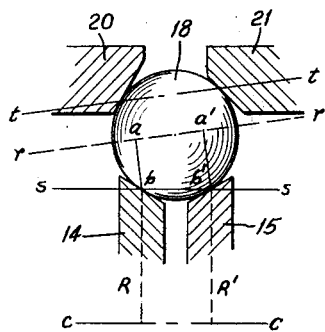
Fig. 3 illustrates one method for obtaining vernier movement by differential action of the unequally beveled halves of an outer ball race forming member.

However, if the bevel of angularity of one half of the outer race member was greater than that of the other half a new condition would exist. Fig. 3 shows such an instance where the left outer race member 20 has less angularity than the right outer race member 21. The ball 18 would now be contacted by these outer race members at points on the line $t—t$. The ball 18 would tend to rotate about an axis $r—r$ parallel to the line $t—t$ when the outer race was turned. The halves 14 and 15 of the inner race member having the same angularity of bevel, and contacting the ball at points $b$ and $b'$ on the line $S—S$, would be urged to rotate about their common axis $C—C$, with equal radii of contact R and R' with the ball 18. However, the effective radius of rotation $ab$ for the left inner race member 14 would be less than the effective radius $a'b'$ for the right inner race member 15, so that for a given number of rotations of the ball 18 the race member 14 would be rotated less than the race member 15, and therefore if one half of this inner race member were held fixed, the other half would be displaced with respect to it. A proportionate amount of vernier movement would be obtained for each angular increment of rotation of the outer race member.

Let radii of left inner race member 14 and right outer race member 15, respecting their points of contact with ball 18, be equal, and let their circumferences each be 42 inches. Let circumference of ball 18 at radius $ab$, acting on race 14, be 2 inches, and let circumference of ball 18 at radius $a'b'$, acting on race 15, be 2.1 inches. Let the circumference of the outer race (composed of the halves 20 and 21 of the outer race member) be such that 36 revolutions of ball 18 occur during 1 complete revolution of the outer race. During 36 revolutions of ball 18 the left inner member 14 would rotate 510 degrees while the right inner member 15 would rotate 520 degrees. Therefore, member 14 would be turned through 10 degrees more than member 15 during one complete revolution of the outer race, and relative motion would occur between the members 14 and 15 such that for one degree rotation of the outer race (20 and 21) the members 14 and 15 would be displaced 1⅔ minutes. Consequently if either member 14 or member 15 is held stationary vernier motion is obtained by the rotation of the other one.

When the angularities of bevel of the halves 20 and 21 of the outer race member are the same and the bevel angularity of the left inner member 14 is less than that of the right inner member 15 or vice versa (see Fig. 4), a condition similar to that explained above exists. In this instance the ball 18 contacts the outer race at points on the line $t—t$ and rotates on the axis $r—r$ parallel to the axis of the inner race $C—C$. The left inner member 14 contacts the ball 18 at $b'$ with a radius of R' while the right inner member 15 contacts the ball 18 at $b$ with a radius of R. Since R is greater than R', and $a'b'$ is greater and $ab$, the effect of relative motion between the halves 14 and 15 is still further emphasized.

Figure 4:
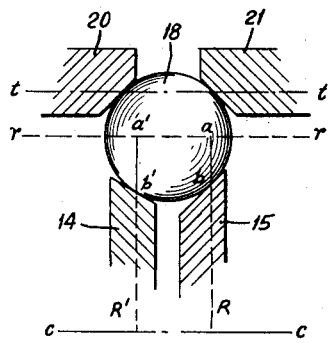
Fig. 4 illustrates another method for obtaining vernier movement by the differential reaction of the unequally beveled halves of an inner ball race forming member.
Figure 5:
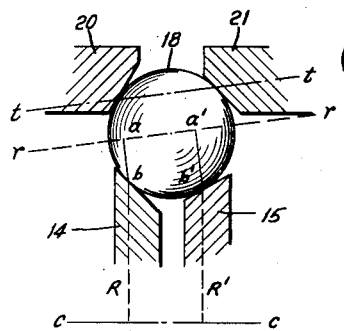
Fig. 5 illustrates another method for obtaining vernier movement by combining the methods illustrated in Figs. 3 and 4.

Fig. 5 shows a method wherein the conditions related with Fig. 3 and those conditions related with Fig. 4 are combined to further heighten the effect of relative motion between the halves 14 and 15 of the inner ball race member. The vernier movement secured by this modification is the least critical of the three methods described in that a very slight difference in bevel angularity between halves of the outer ball race member when combined with the effect of a very slight difference in bevel angularity between halves of the inner ball race member produces very great deviations in relative motion of the two halves of the inner member. The physical dimensions of the members composing the inner ball race and the outer ball race can be materially reduced when employing this method.

Reference Fig. 2 a suggested application of this device may be that of adjusting the printing line of a given printing machine to a platen connected to the sleeved shaft 11. Normally the shaft 13 drives shaft 11 through frictional contact via shaft 13, pin 17, hub 16, right inner ball race member 15, balls 18, left inner ball race member 14, sleeved shaft 11, with predetermined increments of line spacing. Should smaller increments of line spacing be required a pawl may engage the teeth of the circular plate 25 thereby transmitting rotation to the outer race (composed chiefly of the left outer race member 20 and right outer race member 21). Vernier movement is thereby transmitted to shaft 11 via balls 18 through the left inner member 14 since the right inner member 15 is held from rotating by the line space ratchet detent operating on the shaft 13. Manual vernier adjustment is made by rotating the vernier knob 26 and manual line spacing in normal increments is obtained by rotating the major adjustment knob 10. Any of the three methods of securing vernier movement may be employed.

While there has been shown and described and pointed out the fundamental novel features of the invention as applied to three modifications it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A vernier mechanism for adjusting relative position between two axially aligned shafts comprising two disks with unequally beveled facing portions, each desk being supported on the end of one of the said shafts, two cup shaped members surrounding the said disks, the inner edges of the said cup shaped members being beveled with unequal angularity, a plurality of balls mounted in the race formed by the outer periphery of the said disks and the inner periphery of the said cup shaped members and contacting the said beveled portions, means for securing the said cup shaped members together for unitary movement and for supplying pressure to the contacting balls, and means connected to the said cup shaped members for rotating the latter to cause relative rotation between the said disks and their related shafts through rolling contact of the said balls with the beveled portions of said cup shaped members and the beveled portions of the said disks when one of the latter is held from rotating.

2. A mechanism comprising two spaced inner bearing members capable of being rotated, shafts axially aligned and connected at their ends to each of said members, two spaced outer bearing members capable of being rotated about the said inner members, a plurality of balls bearing upon and between the said inner members and the said outer members and mutually supporting the said inner and outer members, the said outer members being joined for unitary movement and being unequally beveled at their points of contact with the said balls to rotate the latter on axes not parallel with the axis of the said inner members when the said outer members are rotated, and the said inner members also being unequally beveled at their points of contact with the said balls to cause each of said inner members to contact the said balls with a different radius, the resulting rolling contact of the said balls upon the said inner members and their related shafts causing one of the latter to rotate when the other is braked.

FRED M. CARROLL.